(12) United States Patent
Liao et al.

(10) Patent No.: US 8,935,696 B2
(45) Date of Patent: Jan. 13, 2015

(54) COMMUNICATION METHOD OF VIRTUAL MACHINES AND SERVER-END SYSTEM

(75) Inventors: Wei-Cherng Liao, New Taipei (TW); Pei-Ling Yu, New Taipei (TW); Victor Chang, New Taipei (TW); Chun-Yen Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 255 days.

(21) Appl. No.: 13/602,206

(22) Filed: Sep. 3, 2012

(65) Prior Publication Data

US 2013/0346971 A1  Dec. 26, 2013

(30) Foreign Application Priority Data

Jun. 26, 2012 (TW) ............................... 101122840 A

(51) Int. Cl.
G06F 9/455 (2006.01)
G06F 15/16 (2006.01)
G06F 15/173 (2006.01)

(52) U.S. Cl.
USPC ............... 718/1; 709/204; 709/206; 709/223; 709/225; 709/227; 709/238; 709/245

(58) Field of Classification Search
None
See application file for complete search history.

(56) References Cited

U.S. PATENT DOCUMENTS 7,145,866 B1 * 12/2006 Ting et al. ..................... 370/225
7,870,153 B2   1/2011 Croft et al.
2007/0217409 A1 * 9/2007 Mann ............................. 370/389
2008/0301225 A1 * 12/2008 Kamura ......................... 709/203
2008/0301770 A1   12/2008 Kinder
2010/0322255 A1 * 12/2010 Hao et al. ....................... 370/398
2011/0029672 A1 * 2/2011 Agneeswaran ................ 709/226
2011/0211463 A1 * 9/2011 Matityahu et al. ............. 370/252
2012/0093160 A1 * 4/2012 Tonsing et al. ................ 370/392
2012/0158997 A1   6/2012 Hsu et al.
2012/0275328 A1 * 11/2012 Iwata et al. .................... 370/252
2012/0291028 A1 * 11/2012 Kidambi et al. ................. 718/1
2013/0058346 A1 * 3/2013 Sridharan et al. ............. 370/392
2013/0086236 A1 * 4/2013 Baucke et al. ................. 709/223

FOREIGN PATENT DOCUMENTS

CN  101410803  4/2009
TW  201225611  6/2012

OTHER PUBLICATIONS

"Office Action of Taiwan Counterpart Application", issued on Sep. 19, 2014, with English translation thereof, pp. 1-22.

* cited by examiner

Primary Examiner — Charles Swift
(74) Attorney, Agent, or Firm — Jianq Chyun IP Office

(57) ABSTRACT

A communication method of virtual machines and a server-end system are provided. A virtual hardware address is assigned to a virtual machine when the virtual machine are established, wherein the virtual hardware address includes a tenant identity. A validation procedure for a packet is performed when the virtual machine desires to communicate with another virtual machine by transmitting the packet, so as to determine whether the virtual hardware addresses of the source-end and the destination-end in the packet have the same tenant identity. If the both virtual hardware addresses have the same tenant identity, the packet is transmitted to the another virtual machine.

14 Claims, 5 Drawing Sheets

COMMUNICATION METHOD OF VIRTUAL MACHINES AND SERVER-END SYSTEM

CROSS-REFERENCE TO RELATED APPLICATION

This application claims the priority benefit of Taiwan application serial no. 101122840, filed Jun. 26, 2012. The entirety of the above-mentioned patent application is hereby incorporated by reference herein and made a part of this specification.

BACKGROUND OF THE INVENTION

1. Field of the Invention

The invention generally relates to a communication technique, and more particularly, to a communication method of virtual machines capable of separating packet flows of virtual machines run by different tenants and a server-end system.

2. Description of Related Art

Along with the development of technologies, virtual machines have been broadly applied to various computer fields, such as the analysis of behavior of malware in personal computers. Generally, a computer host can run multiple virtual machines at the same time, and these virtual machines ran by the same computer host are expected to be independent of each other. When virtual machines belonging to different tenants are run on the same computer, the virtual machines may capture wrong packets if packet flows of these virtual machines are not properly separated.

For example, a tenant A runs two virtual machines (for example, a virtual machine M and a virtual machine N) on a computer host X to analyze how a malware distributes malicious packets, and a tenant B runs another virtual machine (for example, a virtual machine K) on the computer host X to carry out network traffic analysis and research. The virtual machine (for example, the virtual machine K) of the tenant B may produces an abnormal experimental result if it receives any malicious packet distributed by a virtual machine (for example, the virtual machine M) run by the tenant A. Thereby, how to effectively separate packet flows of virtual machines run by different tenants has become a major subject in the industry.

SUMMARY OF THE INVENTION

Accordingly, the invention is directed to a communication method of virtual machines and a server-end system, in which virtual machines run by different tenants are effectively managed and separated.

One aspect of the invention provides a communication method of virtual machines adapted to a server-end system. The server-end system includes a plurality of hosts and a plurality of virtual machines. The communication method of virtual machines includes following steps. When the virtual machines are established, a plurality of virtual hardware addresses is respectively assigned to the virtual machines, wherein each of the virtual hardware addresses includes a tenant identity of the corresponding virtual machine. When a first virtual machine among the virtual machines desires to communicate with a second virtual machine among the virtual machines, a packet is transmitted through the first virtual machine, wherein the packet includes a first virtual hardware address of the first virtual machine and a second virtual hardware address of the second virtual machine, and the first virtual hardware address and the second virtual hardware address are among the virtual hardware addresses. When a communication module receives the packet, a validation procedure is performed on the packet. The validation procedure includes following step. When the first virtual hardware address and the second virtual hardware address have the same tenant identity, the packet is transmitted to the second virtual machine.

Another aspect of the invention provides a server-end system including a management device and a plurality of hosts. The management device assigns a plurality of virtual hardware addresses respectively to a plurality of virtual machines when the virtual machines are established, wherein each of the virtual hardware addresses includes a tenant identity of the corresponding virtual machine. The hosts run the virtual machines, and each of the hosts includes a network interface unit and a processing unit. The hosts communicate with each other through their network interface units. The processing unit is coupled to the network interface unit. The processing unit activates the corresponding virtual machine and drives a communication module. When a first virtual machine among the virtual machines desires to communicate with a second virtual machine among the virtual machines, the first virtual machine transmits a packet, wherein the packet includes a first virtual hardware address of the first virtual machine and a second virtual hardware address of the second virtual machine, and the first virtual hardware address and the second virtual hardware address are among the virtual hardware addresses. When the communication module corresponding to the first virtual machine or the second virtual machine receives the packet, the communication module performs a validation procedure on the packet, and the communication module transmits the packet when the first virtual hardware address and the second virtual hardware address have the same tenant identity.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
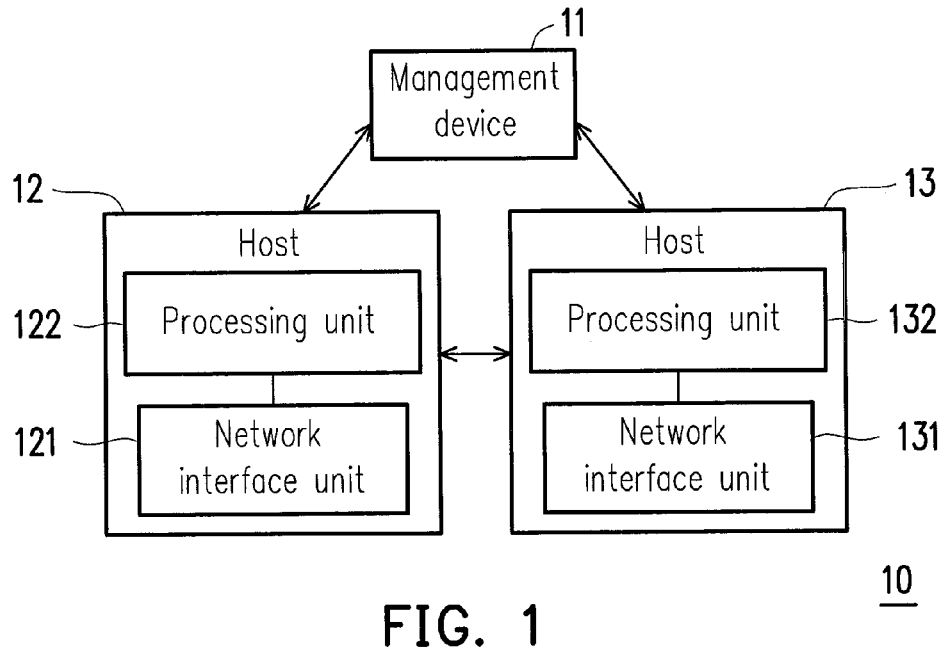
FIG. 1 is a diagram of a server-end system according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to effectively identify packets respectively sent by different virtual machines run by a same tenant when the virtual machines communicate with each other, a communication method of virtual machines is provided by embodiments of the invention. In the communication method of virtual machines, the tenant identities in the virtual hardware addresses carried by a packet that are corresponding to a virtual machine transmitting the packet and a virtual machine expected to receive the packet are validated through a predetermined validation procedure to determine whether the virtual machines belong to the same tenant. Thereby, packet flows of virtual machines run by different tenants can be effectively managed and separated. In addition, a server-end system adopting the communication method of virtual machines is further disclosed in embodiments of the invention. Below, exemplary embodiments of the invention will be described with reference to accompanying drawings.

First Embodiment

FIG. 1 is a diagram of a server-end system according to the first embodiment of the invention. Referring to FIG. 1, the server-end system 10 includes a management device 11, a host 12, and a host 13. It should be noted that even though only the host 12 and the host 13 are illustrated in FIG. 1, the server-end system 10 may actually include a greater or smaller number of hosts. In other words, the number of hosts in the server-end system 10 is not limited in the invention, and one implementing an embodiment of the invention should be able to adjust the number of the hosts according to the actual or design requirement.

The management device 11 may be a server-end host or a typical computer host configured to execute functions such as main control console (MCC) of the server-end system 10. For example, the management device 11 is configured to manage the operation of the entire server-end system 10. In the present embodiment, the management device 11 includes at least a processor, a memory, and a network interface card.

The host 12 and the host 13 are respectively a typical computer host and respectively run one or more virtual machines. Herein a virtual machine is run in the operating system (OS) of a computer host and is usually used for simulating a real computer host.

In the present embodiment, the host 12 includes at least a network interface unit 121 and a processing unit 122, and the host 13 includes a network interface unit 131 and a processing unit 132. The network interface unit 121 and the network interface unit 131 respectively include a network interface card, and the host 12 and the host 13 communicate with each other through the network interface unit 121 and the network interface unit 131.

The processing unit 122 and the processing unit 132 are respectively coupled to the network interface unit 121 and the network interface unit 131. The processing unit 122 and the processing unit 132 respectively activate one or more virtual machines run by the host 12 and the host 13. In the present embodiment, the processing unit 122 and the processing unit 132 may be respectively a micro-processor, an embedded controller, or a central processing unit (CPU). However, the type of the processing unit 122 and the processing unit 132 is not limited in the invention. Additionally, similar to the management device 11, the host 12 and the host 13 may respectively include a memory.

Following exemplary embodiments will be described with reference to the server-end system 10 in the embodiment illustrated in FIG. 1.

Second Embodiment

Figure 2:
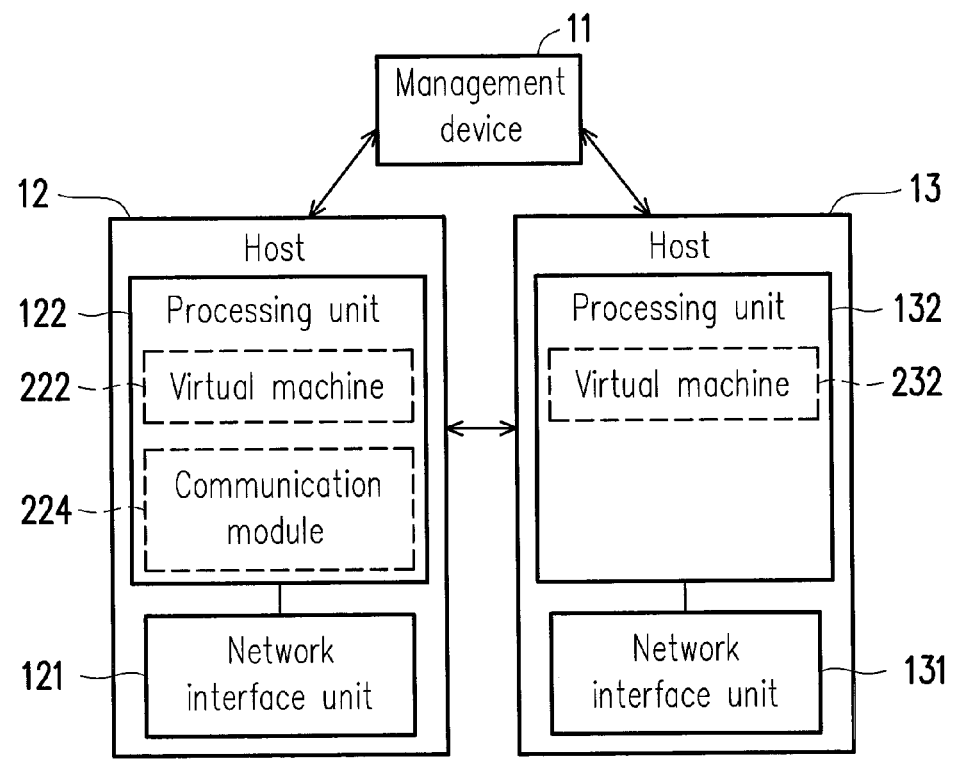
FIG. 2 is a diagram of a server-end system according to a second embodiment of the invention.

FIG. 2 is a diagram of a server-end system according to the second embodiment of the invention. Referring to FIG. 2, for the convenience of description, in the present embodiment, it is assumed that the processing unit 122 and the processing unit 132 respectively run a virtual machine 222 and a virtual machine 232, and the processing unit 122 further runs a communication module 224. In the present embodiment, the communication module 224 performs a validation procedure on a received packet to determine whether the virtual machines respectively transmitting and receiving the packet belong to the same tenant and continues to execute a corresponding operation. In addition, the implementation of the communication module 224 is not limited in the invention. In other words, the communication module 224 may be implemented as a hardware circuit, a firmware, or a software to execute aforementioned function.

Figure 3:
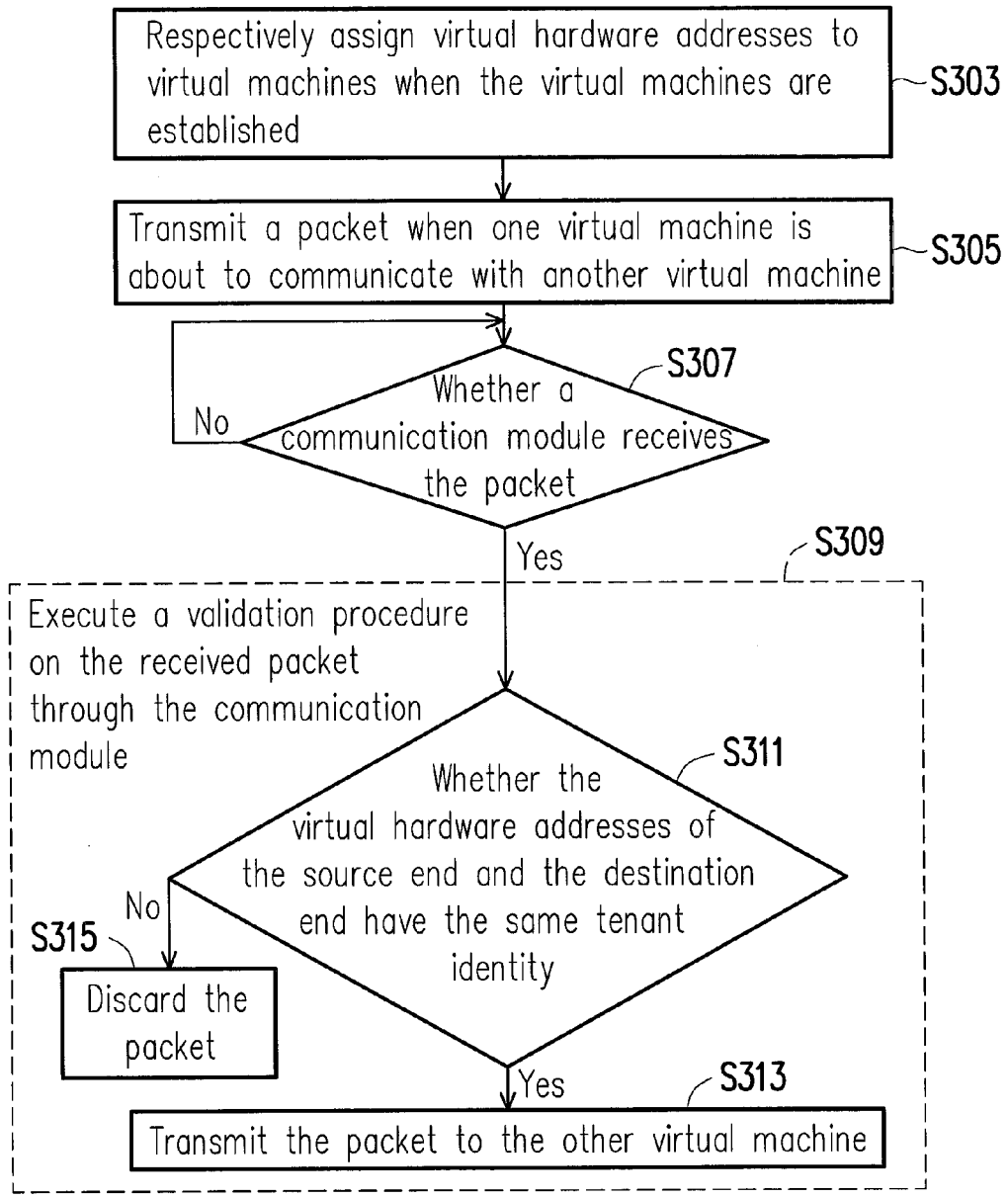
FIG. 3 is a flowchart of a communication method of virtual machines according to the second embodiment of the invention.

FIG. 3 is a flowchart of a communication method of virtual machines according to the second embodiment of the invention. Referring to FIG. 2 and FIG. 3, when the virtual machine 222 and the virtual machine 232 are established, virtual hardware addresses of the virtual machine 222 and the virtual machine 232 are respectively assigned to the processing unit 122 and the processing unit 132 through the management device 11 to be used for identifying the virtual machine 222 and the virtual machine 232. For example, referring to both FIG. 2 and FIG. 3, the processing unit 122 notifies the management device 11 that the virtual machine 222 has been established and run in the host 12 and requests to obtain the virtual hardware address corresponding to the virtual machine 222 from the management device 11 through the network interface unit 121. After that, the management device 11 assigns an unused virtual hardware address to the processing unit 122 as the virtual hardware address of the virtual machine 222 according to a virtual hardware address correspondence table (step S303). The processing unit 132 can obtain the virtual hardware address of the virtual machine 232 from the management device 11 in a similar way, which can be referred to foregoing description and will not be described herein.

It should be noted that in an embodiment of the invention, different virtual machines have different virtual hardware addresses (similar to physical hardware addresses), and each virtual hardware address includes a tenant identity of the tenant running the corresponding virtual machine or any identity for identifying the person or organization running the corresponding virtual machine.

When the virtual machine 222 desires to communicate with the virtual machine 232, the virtual machine 222 transmits a packet (for example, an Internet packet) (step S305). Herein the packet contains the virtual hardware address of the virtual machine 222 and the virtual hardware address of the virtual machine 232. The virtual hardware address of the virtual machine 222 and the virtual hardware address of the virtual machine 232 can be respectively assigned in advance by the management device 11 or obtained by the virtual machine 222 and the virtual machine 232 themselves, such that the source virtual machine and the destination virtual machine of the packet can be determined during the transmission of the packet. Below, a virtual hardware address will be explained in detail with reference to an example.

Figure 4:
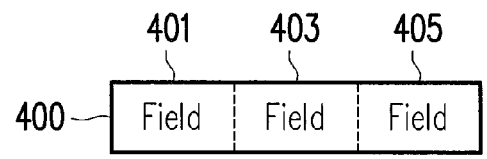
FIG. 4 is a diagram of a virtual hardware address according to the second embodiment of the invention.

FIG. 4 is a diagram of a virtual hardware address according to the second embodiment of the invention. Referring to FIG. 4, in the present embodiment, the virtual hardware address 400 includes a field 401, a field 403, and a field 405. The field 401 records a system information, the field 403 records a tenant identity, and the field 405 records a virtual machine identity. The system information indicates information related to the virtual hardware address 400. For example, the system information contains bit numbers of the field 401, the field 403, and the field 405. The tenant identity is the identity of the tenant running the virtual machine corresponding to the virtual hardware address 400. Namely, different tenants have different tenant identities. Thus, the tenant of the virtual machine corresponding to the virtual hardware address 400 can be identified according to the tenant identity in the virtual hardware address 400. The virtual machine identity is the identity of the virtual machine corresponding to the virtual hardware address 400.

In the present embodiment, the tenant identity and the virtual machine identity may be recorded in a virtual hardware address correspondence table or another similar table in the management device 11. The virtual hardware address 400 may be implemented as a media access control (MAC) address. For example, a 48-bit MAC address is divided into 3 bit groups (i.e., fields). The first bit group has 8 bits and is used for recording the system information. The second bit group has 24 bits and is used for recording the tenant identity. The third bit group has 16 bits and is used for recording the virtual machine identity. Thus, during the transmission of the packet, whether the virtual machine transmitting the packet and the virtual machine expected to receive the packet belong to the same tenant can be quickly determined by comparing the tenant identity in the virtual hardware address of the source end and the tenant identity in the virtual hardware address of the destination end carried by the packet, and after that, the packet can be further transmitted or discarded according to foregoing determination result.

However, in the present embodiment, the fields of the virtual hardware address and the information recorded in these fields are not limited to foregoing description. For example, the virtual hardware address 400 may further include a department field (not shown) for recording a department identity. The department identity indicates the department (for example, a department in a company or an organization) corresponding to the virtual machine having the virtual hardware address 400. Thus, whether the virtual machine transmitting the packet and the virtual machine expected to receive the packet belong to the same tenant and the same department (or only the same department, which is determined according to the actual requirement) can be quickly determined by comparing the tenant identities and the department identities in the source virtual hardware address and the destination virtual hardware address carried by the packet, and after that, the packet can be further transmitted or discarded according to the determination result.

Referring to FIG. 2 and FIG. 3 again, after the virtual machine 222 transmits a packet to communicate with the virtual machine 232, the communication module 224 run by the processing unit 122 determines whether the packet is received (step S307). If the packet is received in step S307, the communication module 224 may temporarily store the packet and perform a validation procedure on the packet to determine whether the virtual machine 222 and the virtual machine 232 belong to the same tenant through the validation procedure (step S309).

During the validation procedure, the communication module 224 determines whether the virtual hardware address of the virtual machine 222 and the virtual hardware address of the virtual machine 232 have the same tenant identity (step S311). If the virtual hardware address of the virtual machine 222 and the virtual hardware address of the virtual machine 232 have the same tenant identity, the communication module 224 determines that the virtual machine 222 and the virtual machine 232 belong to the same tenant and continues to transmit the packet to the virtual machine 232 through the network interface unit 121 (step S313).

On the other hand, if the virtual hardware address of the virtual machine 222 and the virtual hardware address of the virtual machine 232 have different tenant identities, the communication module 224 determines that the virtual machine 222 and the virtual machine 232 belong to different tenants. Accordingly, in order to prevent interference between packet flows of the virtual machine 222 and the virtual machine 232, the communication module 224 discards this packet (step S315).

Additionally, when the packet is transmitted to the host 13 running the virtual machine 232, the virtual machine 232 directly receives the packet. By now, the current packet transmission operation between virtual machines is completed.

Figure 5:
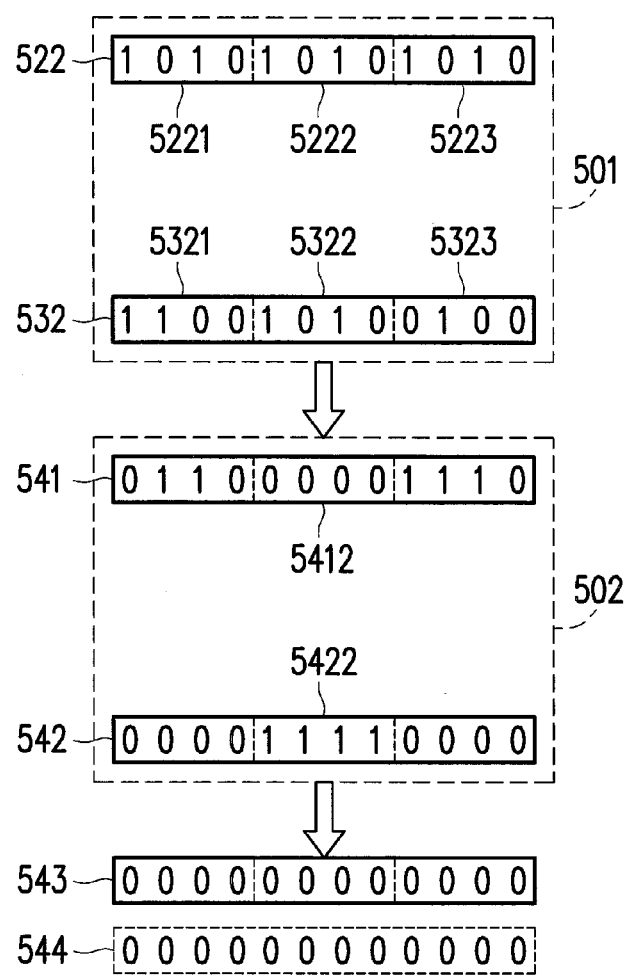
FIG. 5 is a diagram of a validation procedure according to the second embodiment of the invention.

FIG. 5 is a diagram of a validation procedure according to the second embodiment of the invention. Referring to FIG. 2 and FIG. 5, for the convenience of description, the validation procedure will not be described herein by taking the virtual machine 222 and the virtual machine 232 as examples. Herein it is assumed that the virtual hardware address 522 of the virtual machine 222 is 101010101010 and the virtual hardware address 532 of the virtual machine 232 is 110010100100. Regarding the virtual hardware address 522, the field 5221 records a system information 1010, the field 5222 records the tenant identity 1010 of the virtual machine 222, and the field 5223 records the virtual machine identity 1010 of the virtual machine 222. Regarding the virtual hardware address 532, the field 5321 records a system information 1100, the field 5322 records the tenant identity 1010 of the virtual machine 232, and the field 5323 records the virtual machine identity 0100 of the virtual machine 232.

First, the communication module 224 executes an exclusive-OR (XOR) operation on the virtual hardware address 522 (101010101010) of the virtual machine 222 and the virtual hardware address 532 (110010100100) of the virtual machine 232. For example, the XOR operation is executed on the virtual hardware address 522 and the virtual hardware address 532 through a XOR operation module 501 to obtain a first number sequence 541 (011000001110). Then, the communication module 224 executes an AND operation on the first number sequence 541 (011000001110) and a predetermined number sequence 542 (000011110000). For example, the AND operation is executed on the virtual hardware address 522 and the virtual hardware address 532 through an AND operation module 502 to obtain a second number sequence 543 (000000000000). In FIG. 5, the XOR operation module 501 and the AND operation module 502 are respectively a hardware circuit or a software algorithm which can execute the corresponding function. In addition, the predetermined number sequence 542 is substantially determined according to the positions or the fields of the tenant identity in the virtual hardware address 522 of the virtual machine 222 and the virtual hardware address 532 of the virtual machine 232.

Taking the predetermined number sequence 542 in FIG. 5 as an example, because the tenant identities of the virtual machine 222 and the virtual machine 232 are respectively recorded in the field 5222 of the virtual hardware address 522 and the field 5322 of the virtual hardware address 532 and the field 5222 and the field 5322 are corresponding to the field 5412 of the first number sequence 541 and the field 5422 of the predetermined number sequence 542, after the AND operation is executed on the predetermined number sequence 542 and the second number sequence 543, whether the tenant identities of the virtual machine 222 and the virtual machine 232 recorded in the field 5222 and the field 5322 for recording are the same or different can be quickly determined by simply setting all bits in the field 5422 of the predetermined number sequence 542 to the value "1" and any bit not in the field 5422 of the predetermined number sequence 542 to the value "0".

Finally, the communication module 224 determines whether the second number sequence 543 satisfies a predetermined rule 544. If the second number sequence 542 satisfies the predetermined rule 544, the communication module 224 continues to transmit the packet to the virtual machine 232. Taking FIG. 5 as an example, since the second number sequence 543 (000000000000) satisfies the predetermined rule 544 (000000000000), the communication module 224 transmits the packet to the virtual machine 232. If the second number sequence 542 does not satisfy the predetermined rule, the communication module 224 discards the packet.

It should be noted herein that the validation procedure described above is only an implementation of the validation procedure in the invention. In other words, the validation procedure in the invention is not limited to the implementation described above, and any technique capable of comparing the tenant identities in two virtual hardware addresses through a hardware circuit or a software algorithm is within the scope of the invention.

Third Embodiment

The server-end system in the present embodiment is substantially the same as or similar to the server-end system 10 described in foregoing embodiment. Thus, the operation details of various internal components of the server-end system in the present embodiment will not be described herein. In the present embodiment, the validation procedure is performed by a communication module in the host running the destination virtual machine.

Figure 6:
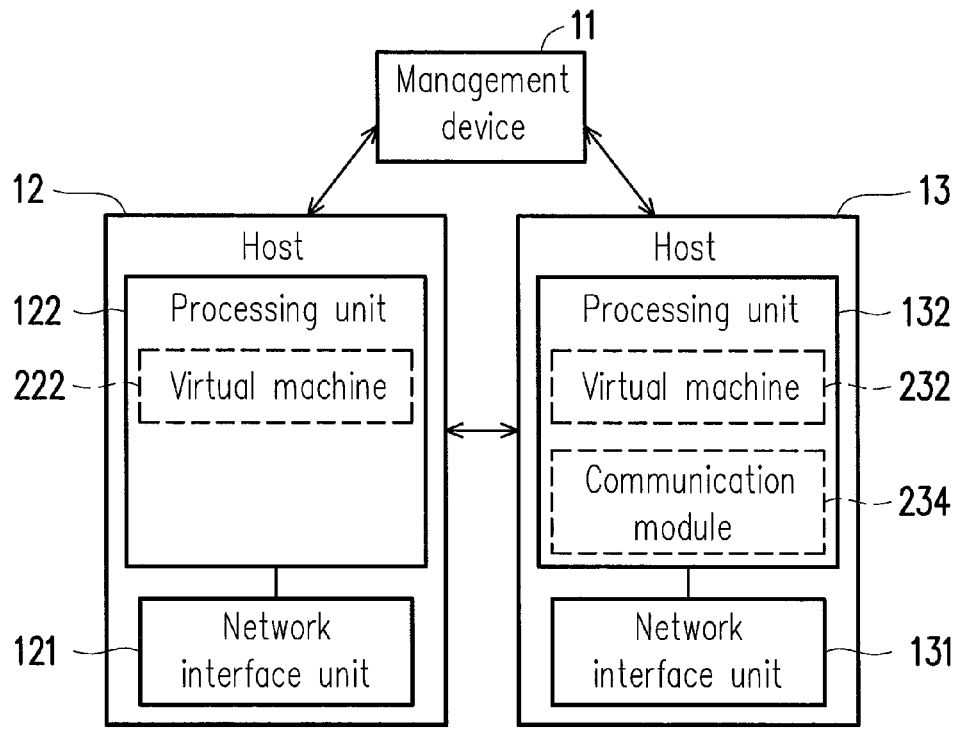
FIG. 6 is a diagram of a server-end system according to a third embodiment of the invention.

FIG. 6 is a diagram of a server-end system according to the third embodiment of the invention. Referring to FIG. 6, in the present embodiment, the processing unit 132 runs the communication module 234. The communication module 234 is similar to the communication module 224. Thus, the operation of the communication module 234 will not be described herein, and any other question can be answered by referring to foregoing descriptions of the communication module 224 and the validation procedure.

The communication method of virtual machines in the present embodiment can be understood with reference to FIG. 3 and following description. Referring to FIG. 3 and FIG. 6, when the virtual machine 222 and the virtual machine 232 are established, the virtual hardware addresses of the virtual machine 222 and the virtual machine 232 are respectively assigned by the management device 11 to the processing unit 122 and the processing unit 132 (step S303). When the virtual machine 222 desires to communicate with the virtual machine 232, the virtual machine 222 transmits a packet (step S305). The difference between the present embodiment and the second embodiment is that in the present embodiment, the validation procedure is performed by the communication module 234 in the host 13 that runs the virtual machine 232.

As described above, the communication module 234 run by the processing unit 132 determines whether the packet is received (step S307). For example, the communication module 234 determines whether the packet is received through the network interface unit 131. If in step S307 the communication module 234 determines that the packet is received, the communication module 234 may temporarily store the packet and perform the validation procedure on the packet to determine whether the virtual machine 222 and the virtual machine 232 belong to the same tenant through the validation procedure (step S309).

Similar to the communication module 224 in FIG. 2, the communication module 234 in the present embodiment determines whether the virtual hardware address of the virtual machine 222 and the virtual hardware address of the virtual machine 232 have the same tenant identity (step S311). If the communication module 234 determines that the virtual hardware address of the virtual machine 222 and the virtual hardware address of the virtual machine 232 have the same tenant identity, it directly transmits the packet to the virtual machine 232 (step S313). By now, the packet transmission operation between virtual machines is completed.

On the other hand, if the communication module 234 determines that the virtual hardware address of the virtual machine 222 and the virtual hardware address of the virtual machine 232 do not have the same tenant identity, the communication module 234 discards the packet (step S315) so that the current packet transmission operation between the virtual machines fails.

The validation procedure in the present embodiment is the same as or similar to that in the second embodiment therefore will not be described herein.

Fourth Embodiment

The server-end system in the present embodiment is substantially the same as the server-end system 10 in foregoing embodiment. Thus, the operation details of various internal components of the server-end system in the present embodiment will not be described herein. In the present embodiment, besides the validation procedure performed at the source end, a validation procedure is further performed at the destination end.

Figure 7:
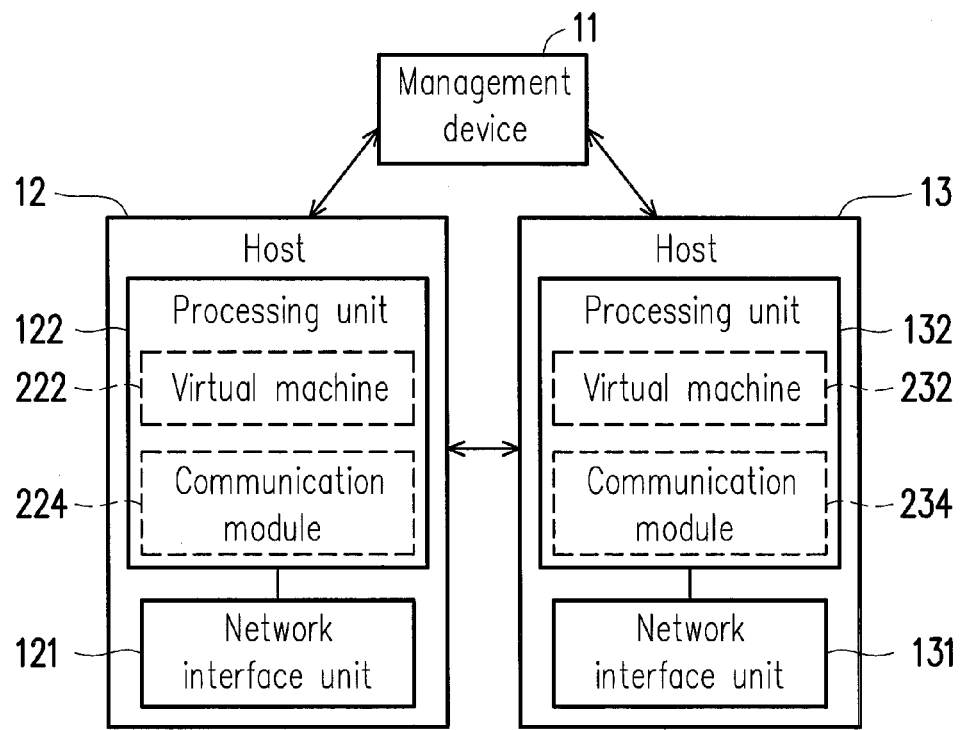
FIG. 7 is a diagram of a server-end system according to a fourth embodiment of the invention.

FIG. 7 is a diagram of a server-end system according to the fourth embodiment of the invention. Referring to FIG. 7, in the present embodiment, besides the virtual machine 222 and the virtual machine 232, the processing unit 122 and the processing unit 132 further respectively run a communication module 224 and a communication module 234. The operation and implementation of the communication module 224 and the communication module 234 have been respectively described in detail in the second embodiment and the third embodiment therefore will not be described herein.

Figure 8:
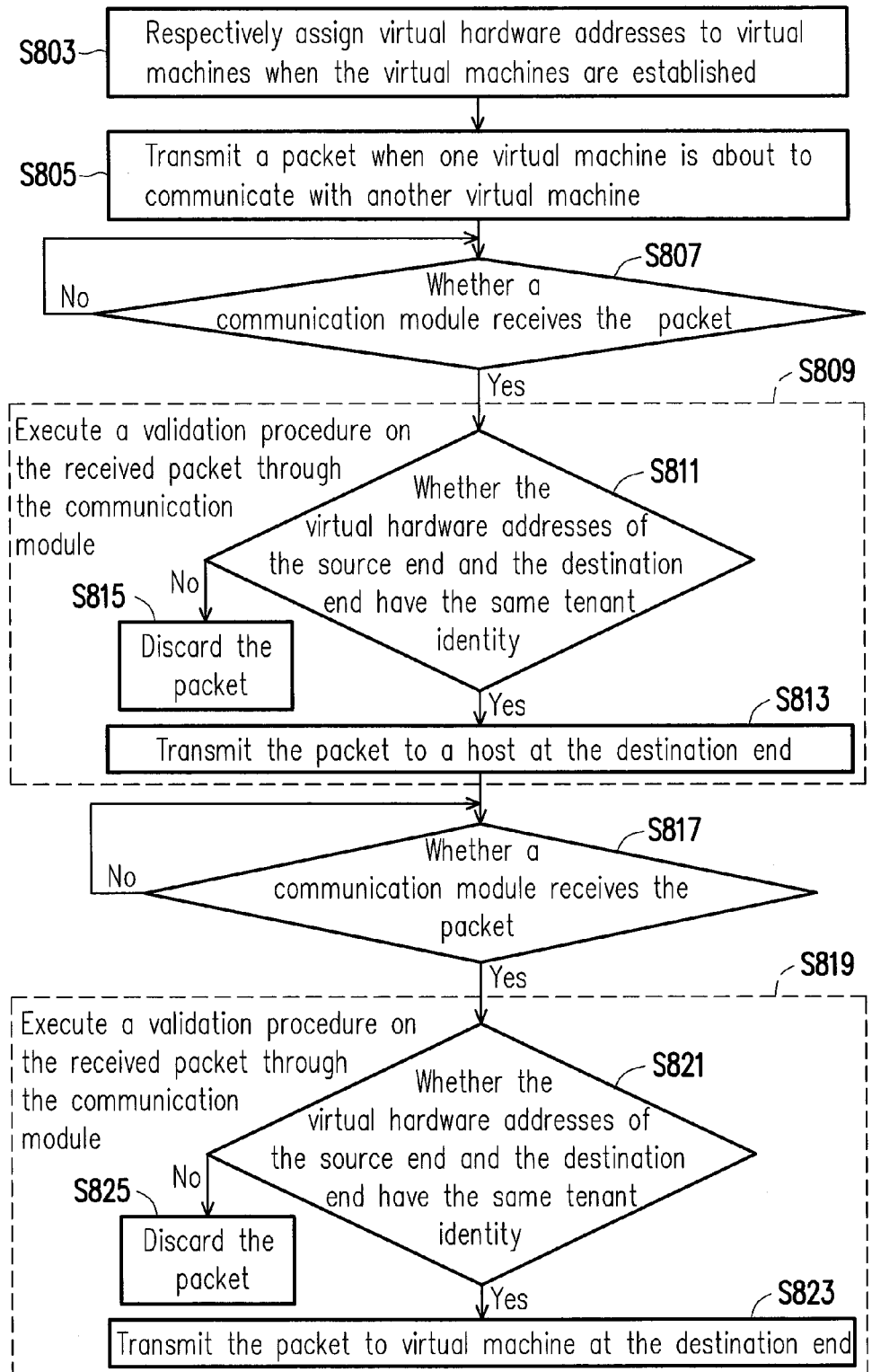
FIG. 8 is a flowchart of a communication method of virtual machines according to the fourth embodiment of the invention.

FIG. 8 is a flowchart of a communication method of virtual machines according to the fourth embodiment of the invention. Referring to FIG. 7 and FIG. 8, when the virtual machine 222 and the virtual machine 232 are established, virtual hardware addresses of the virtual machine 222 and the virtual machine 232 are respectively assigned by the management device 11 to the processing unit 122 and the processing unit 132 to be respectively used for identifying the virtual machine 222 and the virtual machine 232 (step S803).

At the source end, when the virtual machine 222 desires to communicate with the virtual machine 232, a packet (for example, an Internet packet) is transmitted through the virtual machine 222 (step S805). Herein the packet contains the virtual hardware address of the virtual machine 222 and the virtual hardware address of the virtual machine 232 such that the source virtual machine and the destination virtual machine can be identified during the transmission of the packet. In addition, the virtual hardware address of the virtual machine 222 and the virtual hardware address of the virtual machine 232 respectively include the tenant identities of the tenants running the virtual machine 222 and the virtual machine 232.

As described above, the communication module 224 run by the processing unit 122 determines whether the packet is received (step S807). If in step S807 the communication module 224 determines that the packet is received, the communication module 224 may temporarily store the packet and perform a validation procedure on the packet to determine whether the virtual machine 222 and the virtual machine 232 belong to the same tenant through the validation procedure (step S809).

Similar to that described above, in the present embodiment, the communication module 224 determines whether the virtual hardware address of the virtual machine 222 and the virtual hardware address of the virtual machine 232 have the same tenant identity (step S811). If the virtual hardware address of the virtual machine 222 and the virtual hardware address of the virtual machine 232 have the same tenant identity, the communication module 224 continues to transmit the packet to the host 13 at the destination end through the network interface unit 121 (step S813). If the virtual hardware address of the virtual machine 222 and the virtual hardware address of the virtual machine 232 have different tenant identities, the communication module 224 discards the packet (step S815) so that the current packet transmission operation between virtual machines fails.

At the destination end, the communication module 234 run by the processing unit 132 determines whether the packet is received (step S817). For example, the communication module 234 determines whether the packet is received through the network interface unit 131. If in step S817 the communication module 234 determines that the packet is received, the communication module 234 may temporarily store the packet and perform a validation procedure on the packet to determine whether the virtual machine 222 and the virtual machine 232 belong to the same tenant through the validation procedure (step S819). To be specific, the communication module 234 determines whether the virtual hardware addresses of the virtual machine 222 and the virtual machine 232 in the packet have the same tenant identity (step S821). If the virtual hardware address of the virtual machine 222 and the virtual hardware address of the virtual machine 232 have the same tenant identity, the communication module 234 transmits the packet to the virtual machine 232 (step S823). By now, the current packet transmission operation between virtual machines is completed.

On the other hand, if the virtual hardware address of the virtual machine 222 and the virtual hardware address of the virtual machine 232 do not have the same tenant identity, the communication module 234 discards the packet (step S825) so that the current packet transmission operation between virtual machines fails.

It should be mentioned that when two virtual machines run by the same host desire to communicate with each other, the validation procedure is performed by the communication module in the same host. For example, when a virtual machine A desires to communicate with a virtual machine B, a packet is transmitted by the virtual machine A. A validation procedure is performed by the communication module in the host. The packet is transmitted to the virtual machine B after it passes the validation of the communication module.

Moreover, in the embodiments described above, when the packet transmitted by a virtual machine is a broadcast packet, since the packet is not transmitted between two specific virtual machines, no validation procedure is performed on the broadcast packet. For example, when a virtual machine transmits a broadcast packet, the virtual machine can set all the bits in the destination virtual hardware address of the broadcast packet to the value "1". When the communication module detects that all the bits in the destination virtual hardware address in a received packet have the value "1", it directly determines that the packet is a broadcast packet and transmits the packet through broadcasting.

In the embodiments described above, one or more validation procedures are performed on a packet transmitted between virtual machines, and whether the source virtual machine transmitting the packet and the destination virtual machine expected to receive the packet belong to the same tenant and/or the same department is determined by comparing the tenant identities and/or department identities in the virtual hardware addresses respectively corresponding to the source virtual machine and the destination virtual machine in the packet. Besides, whether the packet should be further transmitted or discarded is determined according to foregoing validation result. Thereby, packet flows of virtual machines run by different tenants can be effectively managed and separated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication method of virtual machines, adapted to a server-end system, wherein the server-end system comprises a plurality of hosts and a plurality of virtual machines, the communication method of virtual machines comprising:

when the virtual machines are established, assigning a plurality of virtual hardware addresses respectively to the virtual machines, wherein each of the virtual hardware addresses comprises a tenant identity of the corresponding virtual machine;

when a first virtual machine among the virtual machines desires to communicate with a second virtual machine among the virtual machines, transmitting a packet through the first virtual machine, wherein the packet comprises a first virtual hardware address of the first virtual machine and a second virtual hardware address of the second virtual machine, and the first virtual hardware address and the second virtual hardware address are among the virtual hardware addresses; and when a communication module receives the packet, performing a validation procedure on the packet, wherein the validation procedure comprises:

executing an exclusive-OR (XOR) operation on the first virtual hardware address and the second virtual hardware address to obtain a first number sequence;

executing an AND operation on the first number sequence and a predetermined number sequence to obtain a second number sequence, wherein the predetermined number sequence is determined according to positions of the tenant identity in the first virtual hardware address and the second virtual hardware address; and when the second number sequence satisfies a predetermined rule, transmitting the packet to the second virtual machine.

2. The communication method of virtual machines according to claim 1, wherein each of the virtual hardware addresses comprises a first field, a second field, and a third field for respectively storing the tenant identity, a system information, and a virtual machine identity.

3. The communication method of virtual machines according to claim 2, wherein each of the virtual hardware addresses further comprises a fourth field for storing a department identity, and the step of performing the validation procedure on the packet further comprises:

when the first virtual hardware address and the second virtual hardware address have the same tenant identity and the same department identity, transmitting the packet to the second virtual machine.

4. The communication method of virtual machines according to claim 3, wherein the system information indicates bit numbers of the first field, the second field, the third field, and the fourth field.

5. The communication method of virtual machines according to claim 1, wherein the first virtual machine is run by a first host among the hosts, and the second virtual machine is run by a second host among the hosts, wherein after the step of transmitting the packet through the first virtual machine, the communication method of virtual machines further comprises:

when the communication module of the first host receives the packet, performing the validation procedure on the packet.

6. The communication method of virtual machines according to claim 5, wherein after the step of performing the validation procedure on the packet when the communication module of the first host receives the packet, the communication method of virtual machines further comprises:

after passing a validation of the communication module of the first host, transmitting the packet to the communication module of the second host to perform the validation procedure on the packet; and after passing a validation of the communication module of the second host, transmitting the packet to the second virtual machine.

7. The communication method of virtual machines according to claim 1, wherein the first virtual machine is run by a first host among the hosts, and the second virtual machine is run by a second host among the hosts, wherein after the step of transmitting the packet through the first virtual machine, the communication method of virtual machines further comprises:

when the communication module of the second host receives the packet, performing the validation procedure on the packet.

8. The communication method of virtual machines according to claim 1, wherein the first virtual machine and the second virtual machine are run by a same one of the hosts.

9. A server-end system, comprising:

a management device, assigning a plurality of virtual hardware addresses respectively to a plurality of virtual machines when the virtual machines are established, wherein each of the virtual hardware addresses comprises a tenant identity of the corresponding virtual machine; and a plurality of hosts, running the virtual machines, wherein each of the hosts comprises:

a network interface unit, wherein the hosts communicate with each other respectively through the network interface units; and a processing unit, coupled to the network interface unit, wherein the processing unit activates the corresponding virtual machine running in the processing unit and drives a communication module;

wherein when a first virtual machine among the virtual machines desires to communicate with a second virtual machine among the virtual machines, the first virtual machine transmits a packet, wherein the packet comprises a first virtual hardware address of the first virtual machine and a second virtual hardware address of the second virtual machine, and the first virtual hardware address and the second virtual hardware address are among the virtual hardware addresses, and when the communication module corresponding to the first virtual machine or the second virtual machine receives the packet, the communication module performs a validation procedure on the packet;

wherein the communication module executes an XOR operation on the first virtual hardware address and the second virtual hardware address to obtain a first number sequence and executes an AND operation on the first number sequence and a predetermined number sequence to obtain a second number sequence, wherein the predetermined number sequence is determined according to positions of the tenant identity in the first virtual hardware address and the second virtual hardware address, and when the communication module determines that the second number sequence satisfies a predetermined rule, the communication module transmits the packet to the second virtual machine.

10. The server-end system according to claim 9, wherein each of the virtual hardware addresses comprises a first field, a second field, and a third field for respectively storing the tenant identity, a system information, and a virtual machine identity.

11. The server-end system according to claim 10, wherein each of the virtual hardware addresses further comprises a fourth field for storing a department identity, and the communication module further determines whether the first virtual hardware address and the second virtual hardware address have the same department identity and when the first virtual hardware address and the second virtual hardware address have the same tenant identity and the same department identity, transmits the packet to the second virtual machine.

12. The server-end system according to claim 11, wherein the system information indicates bit numbers of the first field, the second field, the third field, and the fourth field.

13. The server-end system according to claim 9, wherein a first host and a second host among the hosts respectively run the first virtual machine and the second virtual machine, and after a validation of the communication module of the first host is passed, the communication module of the first host transmits the packet to the communication module of the second host to allow the communication module of the second host to perform the validation procedure on the packet, and after a validation of the communication module of the second host is passed, the communication module of the second host transmits the packet to the second virtual machine.

14. The server-end system according to claim 9, wherein a first host among the hosts runs the first virtual machine and the second virtual machine at the same time.

* * * * *